United States Patent
Frenger et al.

(10) Patent No.: US 11,388,545 B2
(45) Date of Patent: *Jul. 12, 2022

(54) DIFFERENTIATED POSITIONING

(71) Applicant: Telefonaktiebolaget LM Ericsson (publ), Stockholm (SE)

(72) Inventors: Pål Frenger, Linköping (SE); Erik Eriksson, Linköping (SE); Fredrik Gunnarsson, Linköping (SE); Martin Hessler, Linköping (SE); Pradeepa Ramachandra, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,240

(22) Filed: Dec. 7, 2020

(65) Prior Publication Data
US 2021/0092549 A1 Mar. 25, 2021

Related U.S. Application Data

(63) Continuation of application No. 16/412,956, filed on May 15, 2019, now Pat. No. 10,880,673, which is a
(Continued)

(51) Int. Cl.
*H04W 4/02* (2018.01)
*H04W 64/00* (2009.01)
(Continued)

(52) U.S. Cl.
CPC ............ *H04W 4/02* (2013.01); *G01S 5/0045* (2013.01); *G01S 5/0236* (2013.01); *H04L 67/18* (2013.01); *H04W 4/025* (2013.01); *H04W 64/00* (2013.01)

(58) Field of Classification Search
CPC ...... H04W 64/00; H04W 4/025; H04L 67/18; G01S 5/0236; G01S 5/0045
See application file for complete search history.

(56) References Cited

U.S. PATENT DOCUMENTS 7,711,376 B2    5/2010   Ogino et al.
9,161,237 B2   10/2015   Kristoffersen et al.
(Continued)

FOREIGN PATENT DOCUMENTS

CN    102204374 A    9/2011
CN    104125638 A   10/2014
(Continued)

OTHER PUBLICATIONS

Chinese Office Action with English Summary Translation dated Jul. 16, 2021 for Patent Application No. 201580082263.4, consisting of 15-pages.
(Continued)

*Primary Examiner* — Nizar N Sivji
(74) *Attorney, Agent, or Firm* — Christopher & Weisberg, P.A.

(57) ABSTRACT

A solution for providing differentiated positioning services in a wireless communication system is provided. For example, a method to be performed by a wireless device is provided, which includes requesting a high accuracy positioning information from the network, e.g. from a network node. The method further includes obtaining information from the network in response to the request, which is valid for a predefined period of time, and which enables the wireless device to obtain the high accuracy positioning information during the predefined period of time. The method further includes performing positioning or assisting performance of positioning based on the obtained high accuracy positioning information.

18 Claims, 10 Drawing Sheets

Related U.S. Application Data continuation of application No. 15/743,942, filed as application No. PCT/SE2015/050859 on Aug. 7, 2015, now Pat. No. 10,341,807.

(51) Int. Cl.
*G01S 5/02* (2010.01)
*G01S 5/00* (2006.01)
*H04L 67/52* (2022.01)

(56) References Cited

U.S. PATENT DOCUMENTS

| | | | |
|---|---|---|---|
| 9,552,371 | B2 | 1/2017 | Kobayashi |
| 9,615,214 | B2 | 4/2017 | Syrjarinne et al. |
| 2004/0008138 | A1 | 1/2004 | Hockley, Jr. et al. |
| 2004/0185865 | A1 | 9/2004 | Maanoja |
| 2005/0153707 | A1 | 7/2005 | Ledyard et al. |
| 2006/0025158 | A1 | 2/2006 | Leblanc et al. |
| 2011/0077023 | A1 | 3/2011 | Won |
| 2011/0176523 | A1 | 7/2011 | Huang et al. |
| 2011/0244891 | A1 | 10/2011 | Ghinamo |
| 2011/0291885 | A1 | 12/2011 | Marshall et al. |
| 2012/0072110 | A1 | 3/2012 | Venkatraman |
| 2012/0208566 | A1* | 8/2012 | Siomina ............ G01S 5/0236 455/456.5 |
| 2012/0244885 | A1 | 9/2012 | Hefetz |
| 2012/0289243 | A1 | 11/2012 | Tarlow et al. |
| 2013/0079039 | A1 | 3/2013 | Heikkilae et al. |
| 2013/0196682 | A1 | 8/2013 | Kristoffersen et al. |
| 2013/0231132 | A1* | 9/2013 | Huang ............ H04W 64/00 455/456.1 |
| 2014/0176366 | A1* | 6/2014 | Fischer ............ H04W 64/006 342/374 |

FOREIGN PATENT DOCUMENTS

| | | |
|---|---|---|
| CN | 104602273 A | 5/2015 |
| EP | 2523013 A1 | 4/2012 |
| JP | 2002299568 A | 10/2002 |
| JP | 2004311511 A | 11/2004 |
| JP | 4092207 | 5/2008 |
| JP | 2013516140 A | 5/2013 |
| JP | 2013222908 A | 10/2013 |
| JP | 2014173891 A | 9/2014 |
| KR | 1020130032334 | 4/2013 |
| KR | 1020130047729 | 5/2013 |
| RU | 2013111840 A | 1/2011 |
| WO | 2004008171 A1 | 1/2004 |
| WO | 2007120326 A2 | 10/2007 |
| WO | 2012108813 A1 | 8/2012 |
| WO | 2013085587 A1 | 6/2013 |

OTHER PUBLICATIONS

European Search Report dated Sep. 6, 2019, for Application No. 15 901 098.2, consisting of 8-pages.
3GPP TS 36.211 V9 1.0; 3rd Generation Partnership Project; Technical Specification Group Radio Access Network; Evolved Universal Terrestrial Radio Access (E-UTRA); Physical Channels and Modulation (Release 9); Mar. 2010, Consisting of 85-pages.
International Search Report and Written Opinion dated Mar. 1, 2016 for International Application No. PCT/SE2015/050859, consisting of 9-pages.
Supplementary European Search Report dated May 30, 2018 for Application No. EP15901098 filed on Aug. 7, 2015, consisting of 3-pages.
Russian Patent Office; Searching Authority: (FIIP) Search Report dated Sep. 11, 2018, for corresponding Application No. PCT/SE2015/050859; International Filing Date: Jul. 8, 2015, consisting of 4-pages.
Japanese Notice of Reasons for Rejection and English Translation dated Mar. 19, 2019 for Japanese Application No. 2018-506338, consisting of 5-pages.
Philippines Substantive Examination Report dated Aug. 20, 2020 for Application No. 1/2017/502368, consisting of 4-pages.
Notice of Preliminary Rejection, dated Nov. 12, 2019 and English language translation for Korean Patent Application No. 10-2018-7006640, consisting of 21 pages.

* cited by examiner 6.10.4.1  Sequence generation

The reference-signal sequence $r_{l,n_s}(m)$ is defined by $$r_{l,n_s}(m) = \frac{1}{\sqrt{2}}(1-2\cdot c(2m)) + j\frac{1}{\sqrt{2}}(1-2\cdot c(2m+1)), \quad m = 0,1,\ldots,2N_{RB}^{max,DL}-1$$

where $n_s$ is the slot number within a radio frame, $l$ is the OFDM symbol number within the slot. The pseudo-random sequence $c(i)$ is defined in Section 7.2. The pseudo-random sequence generator shall be initialised with $c_{init} = 2^{10}\cdot(7\cdot(n_s+1)+l+1)\cdot(2\cdot N_{ID}^{cell}+1)+2\cdot N_{ID}^{cell}+N_{CP}$ at the start of each OFDM symbol where $$N_{CP} = \begin{cases} 1 & \text{for normal CP} \\ 0 & \text{for extended CP} \end{cases}$$

Figure 16

6.10.4.2  Mapping to resource elements

The reference signal sequence $r_{l,n_s}(m)$ shall be mapped to complex-valued modulation symbols $a_{k,l}^{(p)}$ used as reference signal for antenna port $p = 6$ in slot $n_s$ according to $$a_{k,l}^{(p)} = r_{l,n_s}(m')$$

where

Normal cyclic prefix:

$$k = 6(m + N_{RB}^{DL} - N_{RB}^{PRS}) + (6-l+v_{shift})\bmod 6$$

Figure 17

DIFFERENTIATED POSITIONING

CROSS-REFERENCE TO RELATED APPLICATIONS

This application is a continuation of U.S. application Ser. No. 16/412,956, filed on May 15, 2019, which is a continuation of U.S. application Ser. No. 15/743,942, filed on Jan. 11, 2018, which is a U.S. National Stage of International Application No. PCT/SE2015/050859, filed on Aug. 7, 2015, the entireties of all of which are incorporated herein by reference.

TECHNICAL FIELD

The invention relates to positioning in wireless communication networks.

BACKGROUND

In state of the art networks, such as GSM, WCDMA, LTE, and WiFi, distinctively different signals are transmitted from each network cell. In LTE, for example, each cell is associated with a PCI (physical cell identity) that is a locally unique signal used to derive sequences used for e.g. demodulation and synchronization signals. Further, positioning reference signals (PRSs), in e.g. LTE, are derived from the PCI. In any given position, the sum of all locally unique signals, such as PCIs and/or PRSs, typically create a fingerprint that is unique to that particular location.

In such state of the art systems, so-called "over the top" (OTT) and/or third party actors can utilize this property in order to provide positioning services, such as location based advertising, based on network finger-printing. By comparing e.g. Global Positioning, GPS, information available in certain wireless devices with network fingerprints of the same wireless device, the network fingerprints may be mapped to geographical positions, and be used for positioning of other wireless devices which do not have GPS functionality or has turned off the GPS, but still have access to the network fingerprint information. FIG. 1 illustrates a wireless communication system comprising access nodes 101-103, and a wireless device 104. The access nodes all transmit positioning reference signals associated with a respective identity, in this example 17, 56 and 9. The wireless device 104 obtains the signals, e.g. performs measurements on the signals, and the combination of the result of the measurements form a network fingerprint 105. This fingerprint 105 may be obtained by an OTT Positioning Service Provider 106, which then may build a database of network fingerprints and use them for positioning of wireless devices and selling the positioning information to anyone who desires it.

That is, this entails e.g. that a number of OTT actors may track the movements of individual wireless devices, and also sell this information to other parties, neither of which may be in the interest of the users of the tracked wireless devices. It may further not be in the interest of the operators, which provide the signals enabling the network fingerprinting, that third party actors map network fingerprints and make money out of selling positioning information related to their subscribers, typically without compensating the operators which make large investments in the network enabling the positioning. In other words, network builders may not have an interest in investing in networks which provide a positioning value to others which do not contribute to the development, maintenance and/or financing of the network.

However, the users in a system may still want to have the possibility of high accuracy positioning based on signals provided in the network. For example, some users may want access to high accuracy positioning, e.g. indoors, or elsewhere, where GPS signals are not available.

SUMMARY

It is desired to further develop the positioning services in wireless communication networks. The solution provided herein enables differentiated positioning possibilities in a communication network. Users or devices that have no need for high accuracy positioning will have access to basic positioning information, while users or devices requiring high accuracy positioning may obtain such information after a certain procedure. The solution enables providing of high accuracy positioning while saving bandwidth and/or power, as compared to state of the art solutions. Further, the solution enables protection of user integrity, e.g. by preventing third party actors to continuously access high accuracy positions of devices operating in the network. The solution may further prevent third party actors to freely monetize on positioning based on investments made by the operator of a wireless communication system.

According to a first aspect, a method is provided, which is to be performed by a wireless device in a communication network, where the network may be assumed to provide a first type of positioning information. The method comprises requesting a second type of positioning information from the network; and obtaining information from the network in response to the request, which information is valid for a predefined period of time, and which enables the wireless device to obtain the second type of positioning information only during the predefined period of time. The method further comprises performing positioning or assisting performance of positioning based on the obtained second type of positioning information. The second type of positioning information enables positioning with a higher accuracy than the positioning enabled by the first type of positioning information.

According to a second aspect, a method is provided, which is to be performed by a network, e.g. a network node, in a communication network, which provides a first type of positioning information. The method comprises obtaining a request for a second type of positioning information from a wireless device, and further providing information to the wireless device in response to the request, which information is valid for a predefined period of time and which enables obtaining of the second type of positioning information only during the predefined period of time. The method further comprises providing the second type of positioning information.

According to a third aspect, a wireless device is provided, which is operable in a communication network which provides a first type of positioning information. The wireless device is configured to request a second type of positioning information from the network; and to obtain information from the network in response to the request, which information is valid for a predefined period of time and which enables the wireless device to obtain the second type of positioning information only during the predefined period of time. The wireless device is further configured to perform positioning or assist performance of positioning based on the obtained second type of positioning information.

According to a fourth aspect, a network node is provided, which is operable in a communication network providing a first type of positioning information, the network node being configured to obtain a request for a second type of positioning information from a wireless device; and to provide information to the wireless device in response to the request, which information is valid for a predefined period of time and which enables obtaining of the second type of positioning only during the predefined period of time. The network node is further configured to provide the second type of positioning information.

According to a fifth aspect, a computer program is provided, which comprises instructions which, when executed on at least one processor, cause the at least one processor to carry out the method according to the first or second aspect.

According to a sixth aspect, a carrier is provided, which contains a computer program according to the fifth aspect, wherein the carrier is one of an electronic signal, optical signal, radio signal, or computer readable storage medium.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

FIG. 16 is an illustration of section 6.10.4.1 of the 3GPP TS 36.211 Rel-9 specification discussed in the present disclosure.

FIG. 17 is an illustration of section 6.10.4.2 of the 3GPP TS 36.211 Rel-9 specification discussed in the present disclosure.

DETAILED DESCRIPTION

Figure 1:
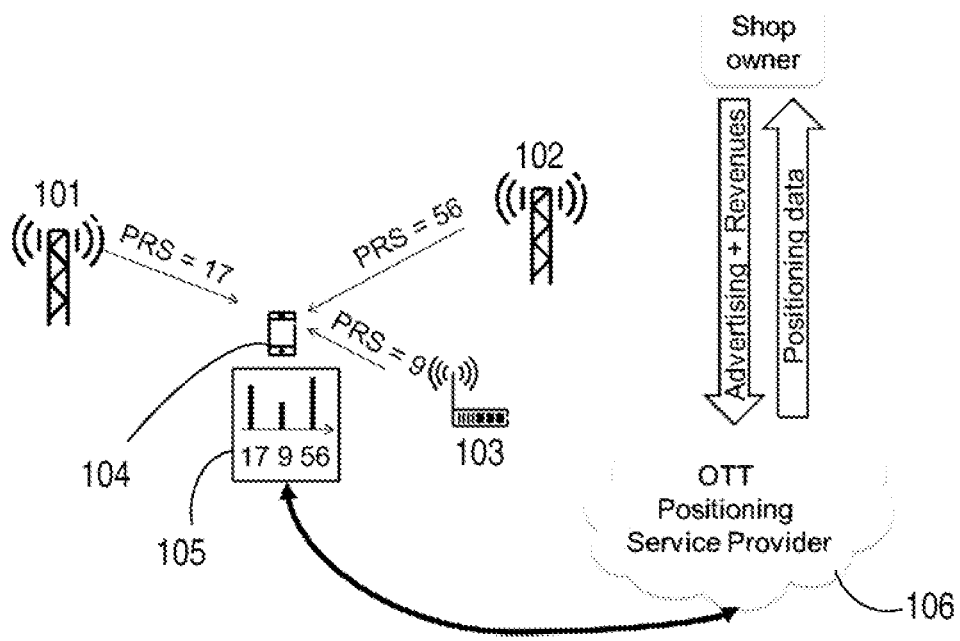
FIG. 1 is a schematic illustration of network fingerprinting utilized by an OTT positioning service provider according to the prior art.

Work is ongoing with designing a baseline for the next generation wide area networks. To reduce energy consumption in a network and to fully enable utilizing high gain beam forming or other multi-antenna techniques, a concept has been defined where the control/broadcast layer is separated from the data plane.

The control layer, here denoted System Control Plane, SCP, is responsible for functions related to random access and paging. To reduce network energy consumption in future wireless communication systems, broadcasted signals are expected to be infrequent, as compared to today's broadcast of reference signals in cellular systems. Further, reference signals in future wireless communication systems are not envisaged to be node-specific as in the systems of today. In such a system, a wireless device in idle mode would not be able to identify, or "see", the individual nodes when moving in the network. The wireless device in idle mode would only be able to detect that a network is present.

Providing network based positioning with high positioning accuracy in such future systems will be costly, since it requires large bandwidth and/or high periodicity signals to be transmitted. Therefore, unless operators can secure revenues for high accuracy positioning services it is unlikely that such services will be developed and deployed in the future communication networks.

As realized by the inventors, a solution to many of the problems mentioned above, could be to enable and provide differentiated positioning services, and that differentiated positioning services, or differentiated positioning accuracy, may be enabled in many different ways e.g. by:
  Providing a positioning key that is valid for a short time or for long time duration
  Providing information that enables a wireless device to decode only a selected sub-set of the available PRS signals transmitted from the network.
  Making selected parts of the PRSs decodable to the wireless device e.g. in time and/or bandwidth.
  Providing additional PRS reference signals in response to requests for higher accuracy.

For example, only parts, or nothing, of the positioning information required to make high accuracy positioning could be made available via default resources. More detailed positioning information enabling high accuracy positioning could be made available to a wireless device e.g. only after a connection has been established and a user authorization is verified.

Further, the detailed information that enables high accuracy positioning may be valid only for a limited time. The network may e.g. start to transmit additional positioning signals as a response to a request for high(er) positioning accuracy from a wireless device. For example, some PRS resources, e.g. from outdoor nodes, may be generally available, while additional PRS resources, e.g. from indoor nodes, are made available via dedicated signaling. Further, the detailed positioning information may reveal information related to parts of PRS sequences used, parts of DL and/or UL time/frequency resources used, wide or narrow-band beam PRS etc.

In future communication systems, sometimes referred to as "5G" systems where "access mobility" is envisaged to be separated from "active mobility", a wireless device may not see the individual nodes as in current communication systems where each cell transmits a set of locally unique signals. As realized by the inventors, when positioning services are added in a system where access mobility is handled by a so-called "ultra-lean" system control plane, it may be controlled, e.g. configurable, whether information related to the position and/or the existence of individual network nodes shall be made available to a particular wireless device or not.

A positioning reference signal (PRS) is typically a signal that is a function of a pseudo-random sequence that is mapped to a set of resource elements in time and frequency.

According to an exemplifying embodiment of the solution described herein, the sequences/resources/descrambling associated with high accuracy positioning are functions of time (t), frequency (f), node ID ($id_1$), system ID ($id_2$), PRS ID ($id_{PRS}$), etc as in state of the art systems, but, in addition, they are also configured to depend on a parameter $\alpha(t)$, that is altered regularly by the network and has to be retrieved via dedicated signaling. An expression describing such positioning reference signals may be e.g.:

$$PRS_n = f(id_n, \ldots, \alpha(t))$$

Below, exemplifying method embodiments will be described with reference to FIGS. 2-4. First, exemplifying methods related to a wireless device will be described, and then corresponding exemplifying methods related to the actions of the network. Implementations of a wireless device and a network node, or arrangement, in a wireless communication network will be described further below.

Figure 2:
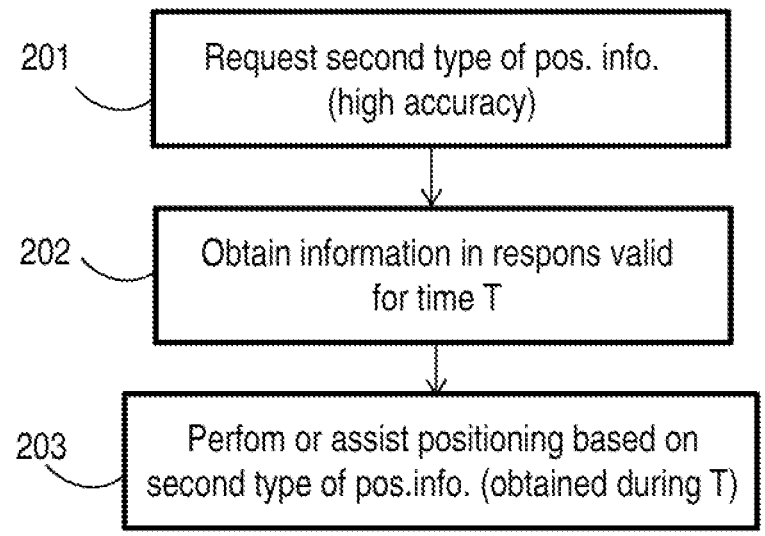
FIGS. 2-4 are flowcharts illustrating exemplifying methods performed by a wireless device according to different embodiments.
Figure 3:
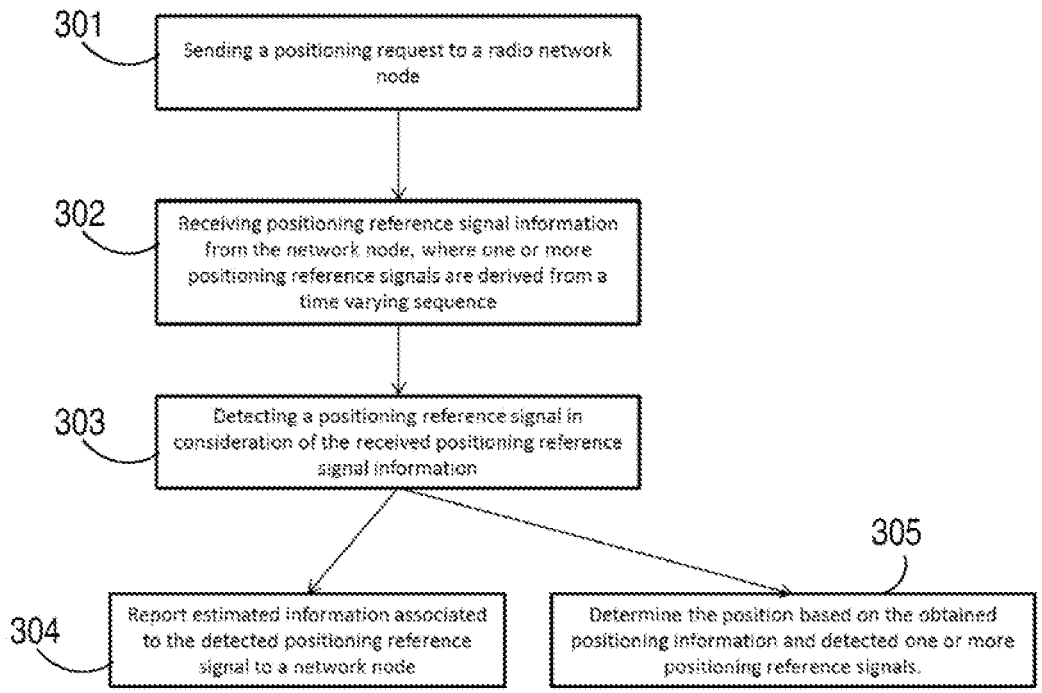
Figure 4:
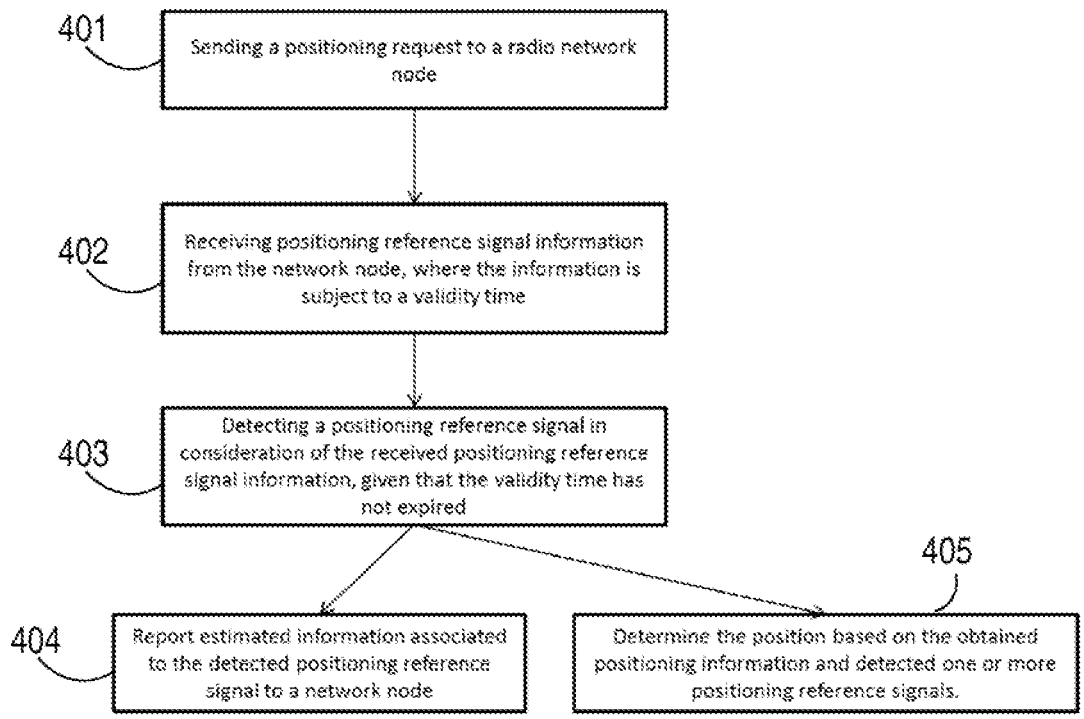

Exemplifying Method Embodiments in Wireless Device, FIG. 2-4

FIG. 2 illustrates a generalized embodiment of the solution described herein. The method is to be performed by a wireless device, which could alternatively be referred to e.g. as a communication device, which is operable in a wireless communication network. The wireless device may be or comprise e.g. a user equipment (UE), such as a smartphone, a tablet, or any other device capable of wireless communication which may need positioning of a higher accuracy than a basic, e.g. low-accuracy, positioning service provided by default by a wireless communication network.

The wireless communication network may be assumed to provide a first type of positioning information, which is associated with a first positioning accuracy. This first type of positioning information may alternatively be denoted e.g. basic, common or public positioning information. The method illustrated in FIG. 2 comprises requesting 201 a second type of positioning information, which is associated with a second positioning accuracy, from the network, e.g. from a network node. The second type of positioning information may alternatively be denoted e.g. extra, additional or on-request positioning information. The method further comprises obtaining 202 information from the network in response to the request, which (information) is valid for a predefined period of time, and which enables the wireless device to obtain the second type of positioning information only during the predefined period of time. The method further comprises performing positioning or assisting performance of positioning 203 based on the obtained second type of positioning information.

The obtained second type of positioning information enables positioning with a higher accuracy than the positioning enabled by the first type of positioning information, and thereby, differentiated positioning is enabled. Wireless devices which have not requested and obtained second type of positioning information from the network will only be able to achieve a basic positioning based on the first type of positioning information, such as e.g. a position in terms of a large region. Wireless devices which have requested and obtained second type of positioning information from the network will, however, be able to achieve positioning with a higher accuracy than when only using the first type of positioning information. An example of higher or high accuracy positioning may be determining of a position within a couple of meters, or a positioning in parity with what may be performed based on GPS signals. Further, third party actors will not be able to collect high accuracy network fingerprints, since the fingerprints will not be the same, or predictable, over time.

The performing of positioning may comprise different actions depending e.g. on whether the position of the wireless device is calculated or derived by the wireless device itself or by the network, e.g. by a network node. This is also illustrated in FIGS. 3 and 4, which will be described further below. In embodiments where the position of the wireless device is calculated by the network, the wireless device reports the second type of positioning information, or at least parts thereof and/or information derived therefrom, back to the network, which then may derive a position of the wireless device. This reporting may be referred to as that the wireless device assists the network to perform the positioning, or as that the wireless device performs positioning by assisting the network to calculate or derive the position of the wireless device. The wireless device may also report other related information to the network, such as e.g. an absolute or relative time of arrival of the second positioning information. A position of the wireless device, which is determined, e.g. calculated or derived, by the network may then be received from the network. Alternatively, the position is determined by the wireless device, and in such a case the second type of positioning information need not necessarily be reported back to the network. In embodiments where the position is calculated or derived by the wireless device, the wireless device may e.g. determine a respective distance to a plurality of network nodes based on second type positioning information received from said network nodes, and derive its position in relation to the plurality of network nodes.

The information obtained in response to the request may comprise a parameter (also exemplified as $\alpha(t)$ herein), which is invalid after the expiry of the predefined period of time. For example, the network may change the parameter, e.g. in a random manner, at regular or irregular intervals. The information may alternatively or in addition comprise an indication of in which communication resources the second type of positioning information may be obtained during the predefined period of time. For example, the radio resources in which the network provides the second type of positioning information may be changed, e.g. in a random manner, at regular or irregular intervals. The information may alternatively or in addition comprise information enabling decoding of the second type of positioning information during the predefined period of time. For example, a code used by the network for encoding the second type of positioning information could be changed by the network, e.g. in a random manner, at regular or irregular intervals. The information may alternatively or in addition comprise the second type of positioning information itself. For example, the network may start to send second type positioning information to the device having requested it, as a response to a request. The network could then send the second type of positioning information during the predefined period of time, and then stop, e.g. if not having received a new request. The second type of positioning information may also in this case be allocated or encoded in a time-limited manner, as described above, such that the wireless device will need a key to be able to obtain it. The information obtained in response to the request may be denoted e.g. positioning reference signal information.

The predefined period of time, during which the wireless device is enabled to obtain the second type of positioning information may be configurable by the network. For example, it may be configured to be shorter than e.g. 24 hours; 12 hours; 1 hour; 1 minute or 5 seconds. These numbers are only intended to be non-limiting examples, but still give a hint about which kind of time period that is envisaged by the inventors.

The second type of positioning information, which is obtainable by the wireless device during the predefined period of time may comprise different types of information. For example, the second type of positioning information may comprise an identity associated with a network node, a cell or a subcell, such as a beam. This identity may be altered by the network, e.g. at intervals, after the predefined period of time, or may only be decodable or derivable based on the information obtained in response to the request. Alternatively or in addition, the second type of positioning information may comprise one or more sequences that support a second timing estimation accuracy, which is finer than a timing estimation accuracy supported by the first type of positioning information. Thereby, the wireless device is enabled to more precisely determine or assist in determining e.g. a distance to one or more network nodes.

The second type of positioning information may alternatively or in addition comprise an information periodicity that support a second time to fix, shorter than a time to fix supported by the first positioning information. "Time to fix" refers to the time that passes from when the need to do positioning comes up to when a position estimate is ready. For example, a time to fix requirements can be in the order of 30 s, while in some applications, such as a vessel control application, the time to fix requirements can be more strict, i.e. a much shorter time to fix may be required, such as e.g. significantly shorter than 1 s. For example, the lower information periodicity, the longer time to fix, since the wireless device may need to wait longer until obtaining positioning information. Alternatively or in addition, the second type of positioning information may comprise one or more sequences that enable fine round-trip time estimation, which may enable a wireless device or the network to e.g. more precisely determine e.g. a distance between the wireless device and one or more network nodes. It should be noted that the second type of information is not received from GPS satellites, but typically from an earth-based wireless communication network.

The performing of the positioning or assisting in performance of the positioning may further be based on the first type of positioning information, i.e. be based on both the first and second type of positioning information. For example, the first type positioning information may be a complement to the second type of positioning information (or vice versa). Assuming that a certain positioning sequence is transmitted by the network; one part of the transmitted sequence may be first type of positioning information, which is obtainable by a wireless device without access to extra information from the network; while another part of the sequence may be second type of positioning information, which is only obtainable by the wireless device when having received the requested time limited extra information from the network, and where high accuracy positioning is performed based on the whole sequence. Alternatively, the second type of positioning information may be used for positioning independently of the first type of positioning information.

The first type of positioning information is associated with a first positioning accuracy which is lower than a positioning accuracy associated with the second type positioning information. The first type of positioning information may comprise e.g. an identity associated with a region of the communication network. Such a region could be large and comprise a plurality of radio access node associated with the network. Alternatively or in addition, the first type of positioning information may comprise an identity associated with a region or one or more nodes in the communication network, and be provided with a low periodicity, as compared to the periodicity of the second type of positioning information, or as compared to the combined periodicity of the first and the second type of positioning information. A higher periodicity enables positioning of a higher accuracy. For example, the first type of positioning information may comprise, e.g. be obtainable at, an information periodicity that supports a first time to fix, which may be longer than a time to fix supported by the second type of positioning information. Alternatively or in addition, the first type of positioning information may comprise one or more sequences that support a first timing estimation accuracy, which may be less fine than a timing estimation accuracy supported by the second type of positioning information.

FIG. 3 shows an exemplifying method embodiment performed by a wireless device. The method comprises sending 301 a positioning request to a radio network node. This request is sent when the wireless device requires positioning with a higher accuracy than what can be achieved based on default positioning information, i.e. the first type of positioning information. In analogy with the wording used above, the positioning request sent in action 301 is a request for a second type of positioning information. Then, positioning reference signal information is received, in response to the request, in action 302. This information may be or comprise one or more positioning reference signals derived (by the network) from a time varying sequence. Further, a positioning reference signal, i.e. a second type of positioning information is detected and thus obtained 303 based on, e.g. in consideration of, the positioning reference signal information received in response to the request. Then, depending on whether the positioning is to be performed by the wireless device or by the network, either action 304 or action 305 is performed. In case the positioning is to be performed by the network, estimated information associated with the detected positioning reference signal is reported 304 to the network, e.g. to a network node. In case the positioning is to be performed by the wireless device, a position is determined 305 based on the received positioning reference signal information and the detected one or more positioning reference signals.

FIG. 4 shows another exemplifying embodiment performed by a wireless device. Also this method comprises sending 401 a positioning request to a radio network node, and receiving 402 positioning reference signal information in response to the request. The positioning reference signal information in this embodiment is described as being subject to a validity time, which in analogy with the wording used above may be denoted predefined period of time. This validity time could be associated with a parameter α(t) which is invalid after the expiry of a predefined period of time, i.e. the validity time. Then a positioning reference signal, i.e. a second type of positioning information is detected 403 in consideration of the positioning reference signal information received in response to the request, given that the validity time has not expired. This is logical, since it will not be possible for the wireless device to obtain the positioning reference signal when the validity time has expired. Actions 404 and 405 correspond to actions 304 and 305 described above.

Method Embodiments in Network, FIGS. 5-9

Embodiments herein further relate to a method performed by the communication network, e.g. by a network node operating in the network. For example, such a network node could be a radio access node, such as high power base station, a low power base station, eNB or an Indoor Radio Unit, IRU, or a core network node, such as a management or control node. The method could be performed in a distributed manner, which will be discussed further below. Correspondingly, the method could be performed e.g. partly in a radio access node and partly in a core network node. The distributed case could be described as that the method is performed by a network node, and that the network node could be distributed in the network, and not necessarily be comprised in one physical unit e.g. close to an antenna. This will be discussed in more detail further below.

The exemplifying method embodiments illustrated in FIGS. 5-9 are to be performed by a wireless communication network, which may be assumed to provide a first type of positioning information associated with a first positioning accuracy. The first type of positioning information is continuously obtainable by wireless devices operating in the network. The embodiments below will be described as being performed by a network node.

Figure 5:
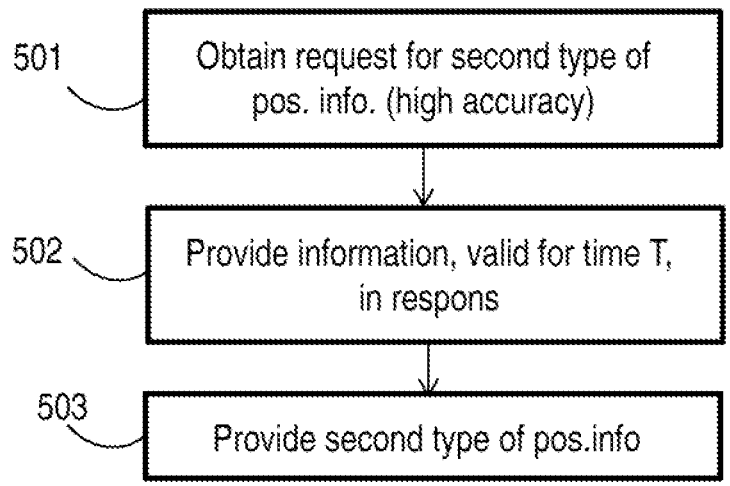
FIGS. 5-9 are flowcharts illustrating exemplifying methods performed by a network node according to different embodiments.

An exemplifying embodiment of a method according to the solution presented herein is illustrated in FIG. 5. The method illustrated in FIG. 5 comprises obtaining 501 a request for a second type of positioning information from a wireless device. The second type of positioning information is associated with a second positioning accuracy. The method further comprises providing 502 information to the wireless device in response to the request, which (information) is valid for a predefined period of time and which enables obtaining of the second type of positioning information only during the predefined period of time. The method illustrated in FIG. 5 further comprises providing 503 the second type of positioning information. The second type of positioning information enables positioning of wireless devices with a higher accuracy than a positioning enabled by the first type of positioning information.

The request for resources may be obtained 501, e.g. received, either directly from the wireless device, or, when the method is implemented in a core network node or in a distributed manner, the request may be obtained from the wireless device via one or more other network nodes.

The providing 502 of information in response to the request may comprise signaling the information to the wireless device, either directly, or via one or more other nodes. The providing 502 may alternatively or in addition comprise inducing or triggering another entity in the communication network to provide the information in response to the request.

Similarly, the providing 503 of second type of positioning information may comprise signaling the information to the wireless device, either directly, or via one or more other nodes. The providing 503 may alternatively or in addition comprise inducing or triggering one or more other nodes or entities in the communication network to provide positioning information of the second type to the wireless device. Depending e.g. of the type and implementation of the wireless communication network, the second type of positioning information may be broadcasted or transmitted to the wireless device in a more dedicated manner, e.g. in a narrow beam or by dedicated signaling.

For further details about the characteristics of the request, the information provided in response to the request and the first and second type of positioning information it is referred to the description of the method performed by a wireless device above.

Figure 6:
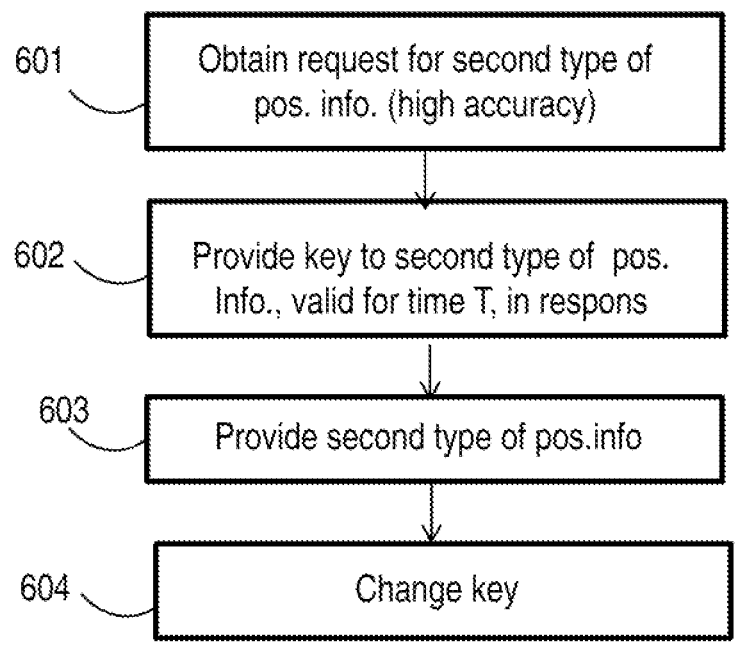

FIG. 6 illustrates an exemplifying embodiment, where the information provided 602 in response to the request is a key, such as an indicator of how and/or where to obtain the second type of positioning information during a time T. When a time T has expired, the key is changed 604, e.g. reconfigured based on information or instructions received from a control node, such as a positioning management node.

Figure 7:
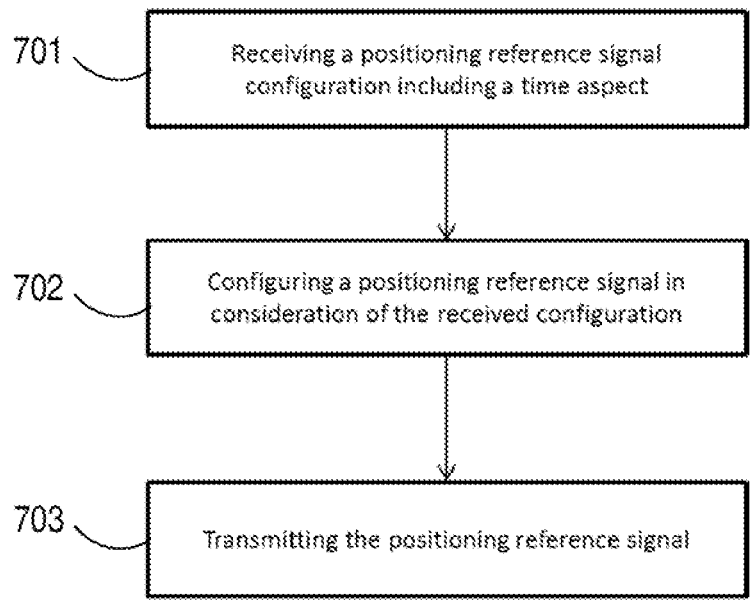
Figure 8:
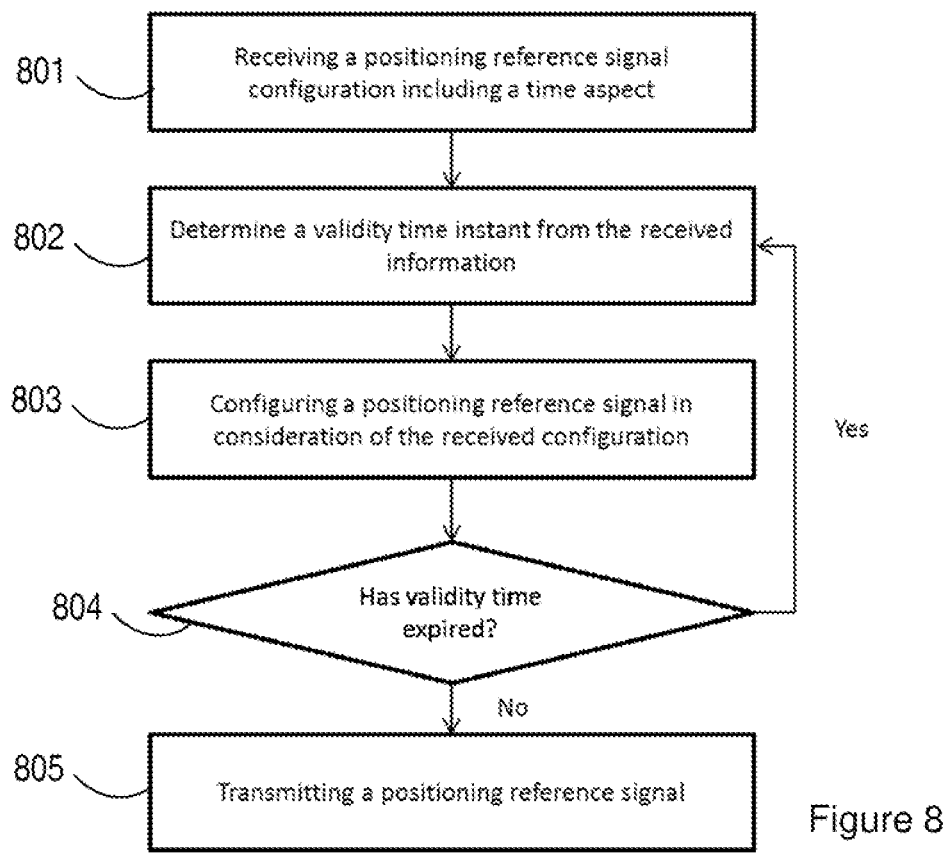

FIG. 7 shows an exemplifying embodiment performed by a network node. The method comprises receiving 701 a positioning reference signal configuration including a time aspect. This configuration may be received from a control node or function. The time aspect may be e.g. a time interval, at which a positioning reference signal should be reconfigured in order not to be available by default to wireless devices in the network. The network node then configures 702 a positioning reference signal in consideration of the received configuration, and may then transmit 703 the positioning reference signal ($2^{nd}$ type of positioning information) to one or more wireless devices. The positioning reference signal may either be transmitted upon request, or be transmitted at intervals but only be obtained by wireless devices having requested and received information enabling the obtaining during a predefined period of time FIG. 8 shows an exemplifying embodiment, where positioning reference signal configuration including a time aspect is received 801. Here, a validity time instant or interval is determined 802 from the received configuration. For example, it could be determined for how long a configured positioning reference signal should be valid, i.e. obtainable by wireless devices having requested and obtained current positioning reference signal information, e.g. a key or parameter $\alpha(t)$. A positioning reference signal is configured 803 in consideration of the received configuration. Then, it is evaluated 804 whether the validity time has expired or not. As long as the validity time has not expired, the configured positioning reference signal may be transmitted 805 as second type of positioning information, i.e. high accuracy positioning information. However, when the validity time has expired, a new validity time may be determined, and a new positioning reference signal is configured 803, which may be expressed as that the positioning reference signal is reconfigured. Alternatively, the validity time may be the same for each configured positioning reference signal.

Figure 9:
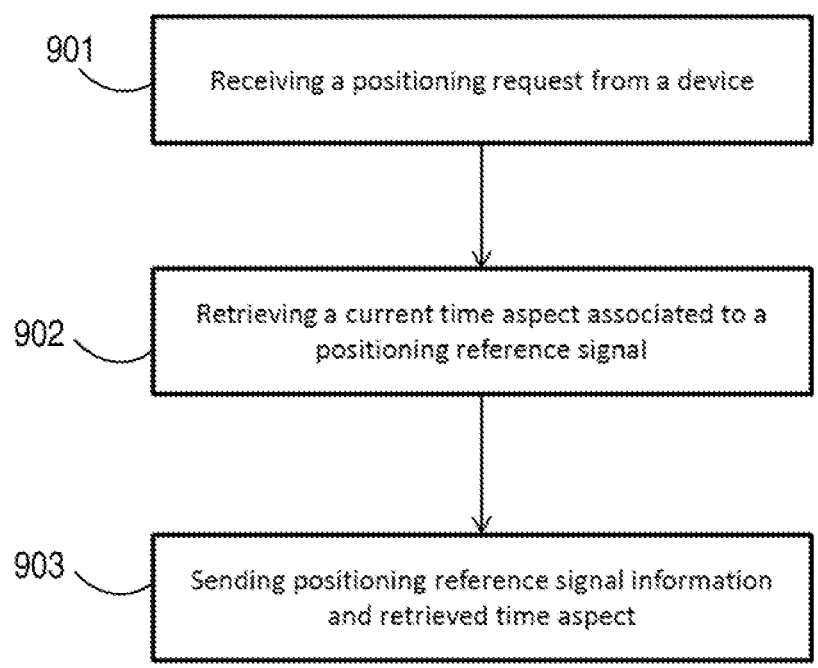

FIG. 9 shows an exemplifying embodiment where a positioning request is received 901 from a wireless device. Further, a current time aspect associated with a positioning reference signal is retrieved, e.g. determined or derived 902. This current time aspect may be e.g. a currently running validity time of a current positioning reference signal. Then, in response to the received request, positioning reference signal information, such as a key to obtaining the current positioning reference signal, and the retrieved time aspect are sent 903 to the wireless device.

In some embodiments, the position of the wireless device is determined by the wireless device itself, and may then be received from the wireless device. Alternatively, in some embodiments, the position of the wireless device is determined by the network node, and in such cases the network receives feedback from the wireless device based on the second type of positioning information, and determines a position of the wireless device based on this feedback. A position of the wireless device, which is determined, e.g. calculated or derived, by the network may then be provided to the wireless device and/or to other nodes, and/or be utilized by the network e.g. to make decisions related to the wireless device.

Below, some further possible features, details and examples of embodiments of the solution provided herein will be described.

Figure 10:
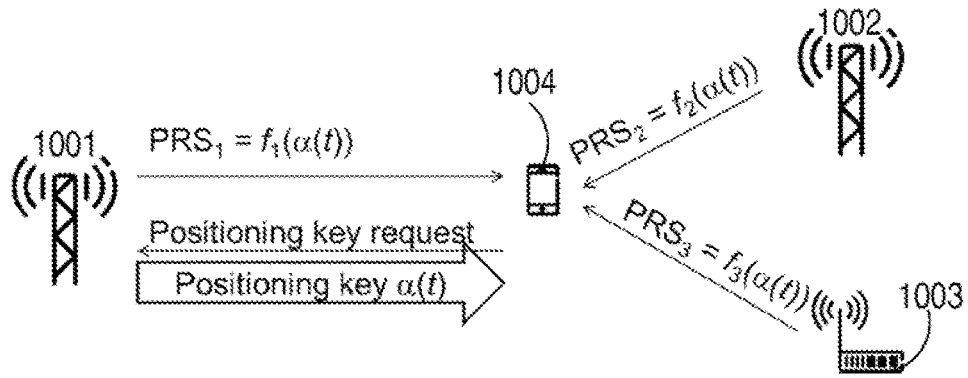
FIG. 10 is a schematic illustration of signaling in a wireless communication network according to an exemplifying embodiment.

The use of a parameter α(t), that is altered regularly, or irregularly, by the network and has to be retrieved via dedicated signaling is exemplified in FIG. 10. In this example, different nodes, 1001-1003 transmit different positioning reference signals, $PRS_i$. The signals are not fully useful for the wireless device 1004 unless it knows the time varying sequence α(t) used to generate the signals. The time-varying, and time-limited, parameter α(t) may be referred to as a "positioning key", since it enables the wireless device 1004 to unlock the high accuracy positioning capabilities provided by the network.

Figure 11:
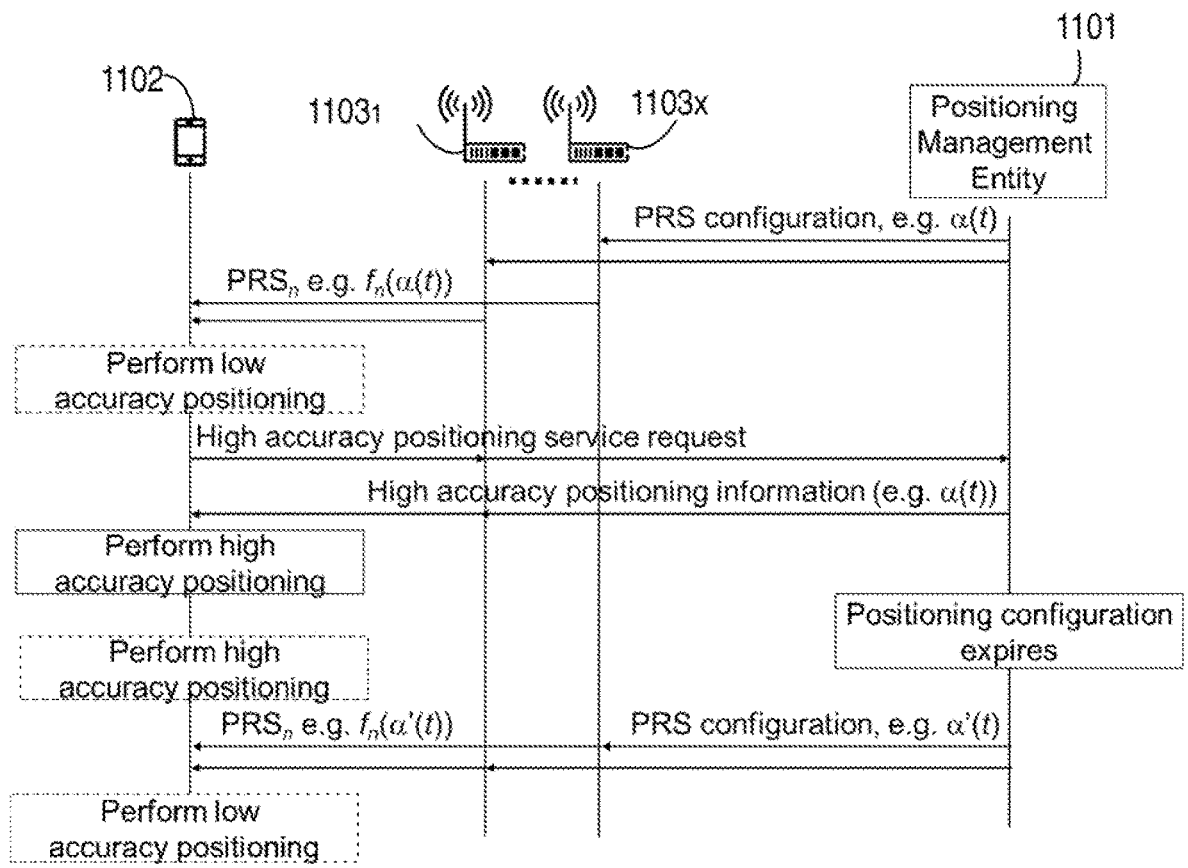
FIG. 11 is a signaling diagram illustrating signaling between and actions performed by wireless devices and network nodes in a wireless communication network according to an exemplifying embodiment.

A more detailed exemplifying embodiment is provided in FIG. 11. In this example, a network entity 1101 denoted "Positioning management entity", PME, configures the network nodes $1103_1$-$1103_x$ with a time varying and time-limited PRS configuration, which is based e.g. on a parameter α(t). The network node n then transmits a signal, $PRS_n$, that is a function of the PRS configuration, and thus of α(t). Since the wireless device 1102 in this example has no information about the current PRS configuration, it cannot perform a high accuracy positioning using the PRS signals. Optionally, it may perform a low accuracy positioning e.g. using part of the PRS information that does not depend on the parameter α(t).

If the wireless device determines that a high accuracy positioning (using the PRS signals) is needed, it sends a request to the network. This could be performed e.g. via the currently serving node that may then forward the request to the positioning management entity node. In response to the request, information required to perform high accuracy positioning may be received by the wireless device 1102.

After some time period, the received information required to perform high accuracy positioning expires, and the PME configures the network nodes with a new PRS configuration. Unless the wireless device has received an update containing information related to this new configuration, it can now no longer perform a high accuracy positioning.

It should be noted that these exemplifying embodiments only are non-limiting examples. Alternative solutions could be e.g. that the network nodes $1103_1$-$1103_x$ in FIG. 11 handle the PRS expiration timers and re-configuration autonomously after an initial configuration e.g. by an OSS (operation and support system) or SON (self-optimizing network) node.

Examples of Changes of Existing Standards

The solution described herein could be applied both in existing and in future wireless communication systems. Below, some examples of how a current standard, such as the 3GPP LTE standard, could be changed in order to implement the solution. Only a few examples will be listed, as it would be difficult to list all possibilities.

Changing the Sequence Generation

The PRS signals defined for LTE are specified in the 3GPP TS 36.211 Rel-9 specification. The sequence generation is specified in section 6.10.4.1 as shown in FIG. 16:

One exemplifying way to implement the solution provided herein in this standard would be to change the definition of the parameter $C_{init}$ that is used to initialize the pseudo-random sequence generator as follows:

$$c_{init}=2^{10} \cdot (7 \cdot (n_s+1)+l+1) \cdot (2 \cdot N_{ID}^{cell}+1)+2 \cdot N_{ID}^{cell}+N_{CP}+\alpha(t)$$

where α(t) is a new parameter that is time dependent, e.g. in a manner that makes the reference signal sequence obtainable by wireless devices only during a configurable time period, i.e. a predefined time period or a validity time.

Changing the Resource Element Mapping

The mapping of the PRS sequence onto resource elements is defined by the LTE specification 3GPP TS 36.211 Rel-9 specification in section 6.10.4.2 as shown in FIG. 17:

Here, one option to implement the solution described herein is to change the parameter k e.g. as follows:

$$k=6(m+N_{RB}^{DL}-N_{RB}^{PRS})+(6-l+v_{shift})+\alpha(t) \bmod 6,$$

which would result in that different resource elements are used for the transmission of the PRS. The new parameter α(t) being time dependent as above.

Changing PRS Sub-Frame Mapping

One change that could be made in order to implement the solution provided herein is to change the mapping in regard of which sub-frames that are used for PRS transmission. For example, a pseudo-random pattern depending on a time-varying parameter α(t) or a shifted periodic pattern derived from a time varying shift are possible solutions.

Changing PRS Transmission Time

In one possible embodiment a time offset is added to the PRS signal. The PRS specific time shift would then be dependent on a time-varying parameter α(t). The time shift can be implemented e.g. as a phase shift of the frequency domain symbols or as an actual time offset in the transmission of the PRS.

Exemplifying Implementations

The methods and techniques described above may be implemented in wireless devices and in a wireless communication network, e.g. in one or more network nodes, such as e.g. radio access nodes and/or core network nodes. The methods could be implemented in a distributed manner, e.g. a plurality of nodes or entities could each perform a part of the actions e.g. at different locations in the network. For example, one or more embodiments could be implemented in a so-called cloud solution, or a "Centralized RAN" or "Split Architecture", where e.g. an eNodeB is divided into 2 or more separate nodes. Correspondingly, the network could be configured such that actions of the method embodiments are performed e.g. partly in a radio access node and partly in a core network node. The distributed case could be referred to or described as that the method is performed by an arrangement or a network node operable in the communication network, but that the arrangement or the network node could be distributed in the network, and not necessarily be comprised in a physical unit e.g. close to an antenna. Examples of distributed and non-distributed implementations will be given further below, with reference to FIGS. 14 and 15.

Figure 12A:
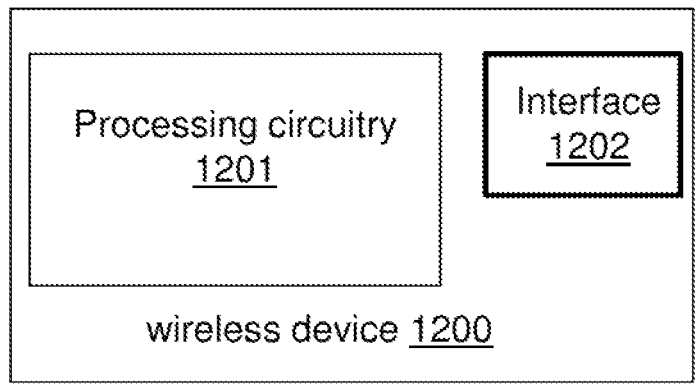
FIGS. 12a-12c are schematic block diagrams illustrating different implementations of a wireless device, according to exemplifying embodiments.
Figure 12B:
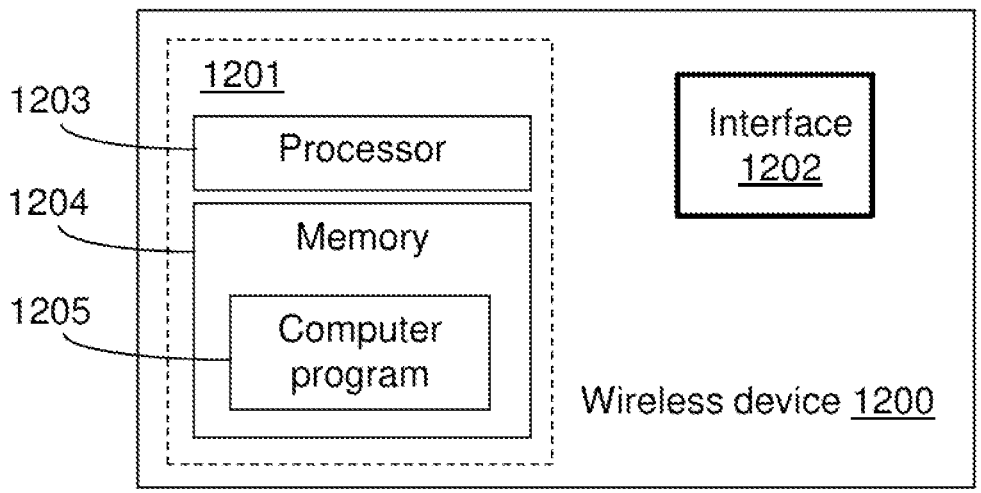
Figure 12C:
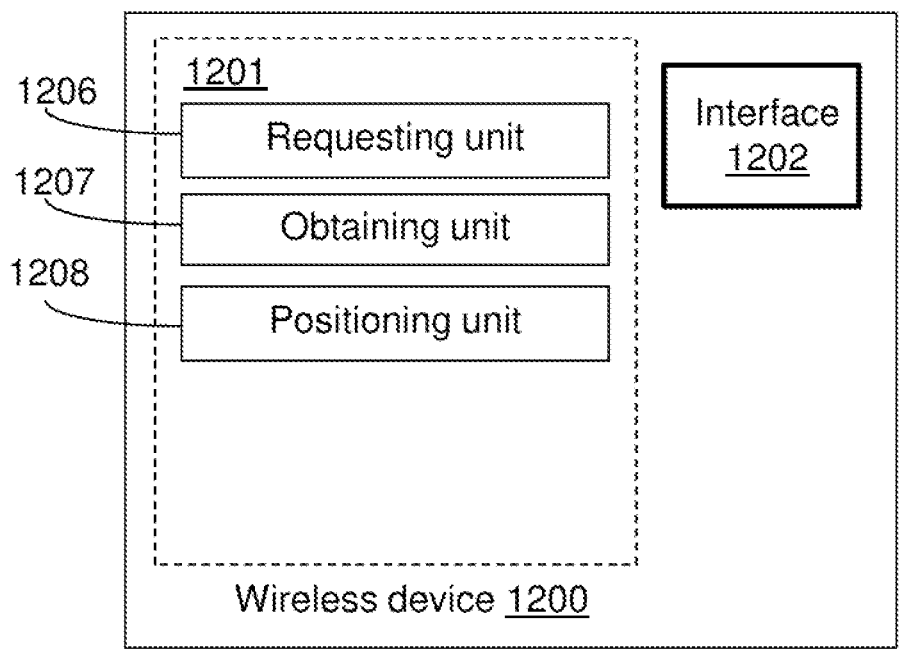

Wireless Device, FIGS. 12a-12c

An exemplifying embodiment of a wireless device is illustrated in a general manner in FIG. 12a. The wireless device may be assumed to be operable in a wireless communication network. The wireless device 1200 is configured to perform at least one of the method embodiments described above with reference to any of FIGS. 2-4. The wireless device 1200 is associated with the same technical features, objects and advantages as the previously described method embodiments. The wireless device will be described in brief in order to avoid unnecessary repetition. The wireless device, which may alternatively be denoted e.g. a communication device, may be e.g. a user equipment (UE) in the form of a so-called smartphone, a mobile phone, a video camera, a sound recorder, a tablet, a laptop or any other device capable of wireless communication which may need to request resources from a wireless communication network. For example, the wireless device may be a machine-to-machine (M2M) device, a Personal Digital Assistant (PDA) equipped with radio communication capabilities or a sensor device equipped with radio communication capabilities or the like. Such a sensor may be any kind of weather sensor, such as wind, temperature, air pressure, humidity, or, the sensor may be a light sensor, an electronic or electric switch, a microphone, a loudspeaker, a camera sensor etc. The wireless device may also be adapted to be positioned in, i.e. being embedded in, a vessel, such as a ship, flying drone, airplane and a road vehicle, such as a car, bus or lorry. Such an embedded device would typically belong to a vehicle telematics unit or vehicle infotainment system.

The wireless device may be implemented and/or described as follows:

The wireless device 1200 comprises processing circuitry 1201 and a communication interface 1202. The processing circuitry 1201 is configured to cause the wireless device 1200 to request a second type of positioning information from the network. The processing circuitry 1201 is further configured to cause the wireless device to obtain information from the network in response to the request, which information is valid for a predefined period of time and which enables the wireless device to obtain the second type of positioning information only during the predefined period of time. The processing circuitry 1201 is further configured to cause the wireless device to perform positioning or assist performance of positioning based on the obtained second type of positioning information. The second type of positioning information enables positioning with a higher accuracy than the positioning enabled by the first type of positioning information. The communication interface 1202, which may also be denoted e.g. Input/Output (I/O) interface, includes a network interface for sending data to and receiving data from e.g. radio access nodes.

The processing circuitry 1201 could, as illustrated in FIG. 12*b*, comprise processing means, such as a processor 1203, e.g. a CPU, and a memory 1204 for storing or holding instructions. The memory would then comprise instructions, e.g. in form of a computer program 1205, which when executed by the processing means 1203 causes the wireless device 1200 to perform the actions described above.

An alternative implementation of the processing circuitry 1201 is shown in FIG. 12*c*. The processing circuitry here comprises a requesting unit 1206, configured to cause the wireless device to request a second type of positioning information from the network. The processing circuitry further comprises an obtaining unit 1207, configured to cause the wireless device to obtain information from the network in response to the request. The processing circuitry further comprises a positioning unit 1208 configured to cause the wireless device to perform positioning or assist performance of positioning based on the obtained second type of positioning information. The processing circuitry could comprise more units, such as e.g. a determining unit for determining e.g. whether a time has expired, and a new request for second type of positioning information should be sent.

The wireless devices described above could be configured for the different method embodiments described herein, e.g. in regard of the type or information obtained in response to a request. The wireless device 1200 may be assumed to comprise further functionality, for carrying out regular wireless device functions.

Figure 13A:
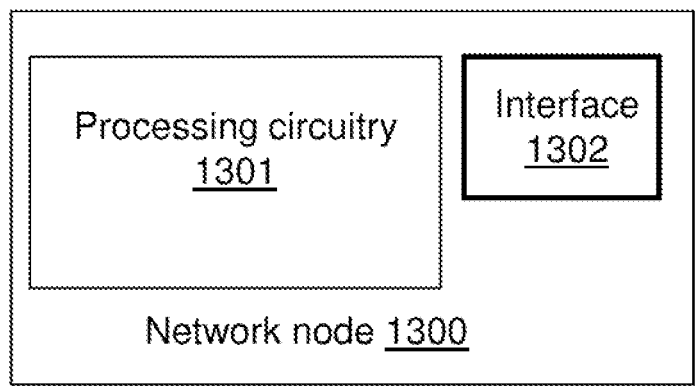
FIGS. 13a-13c are schematic block diagrams illustrating different implementations of a network node, according to exemplifying embodiments.
Figure 13B:
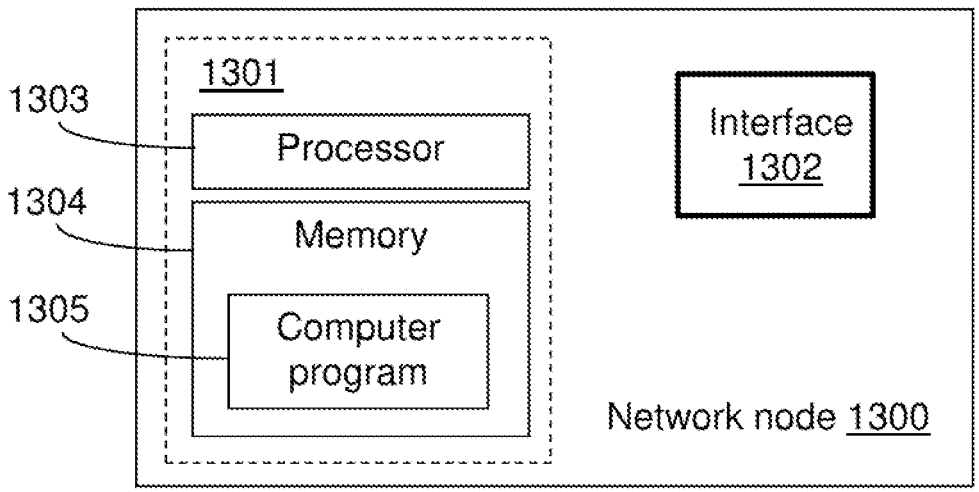
Figure 13C:
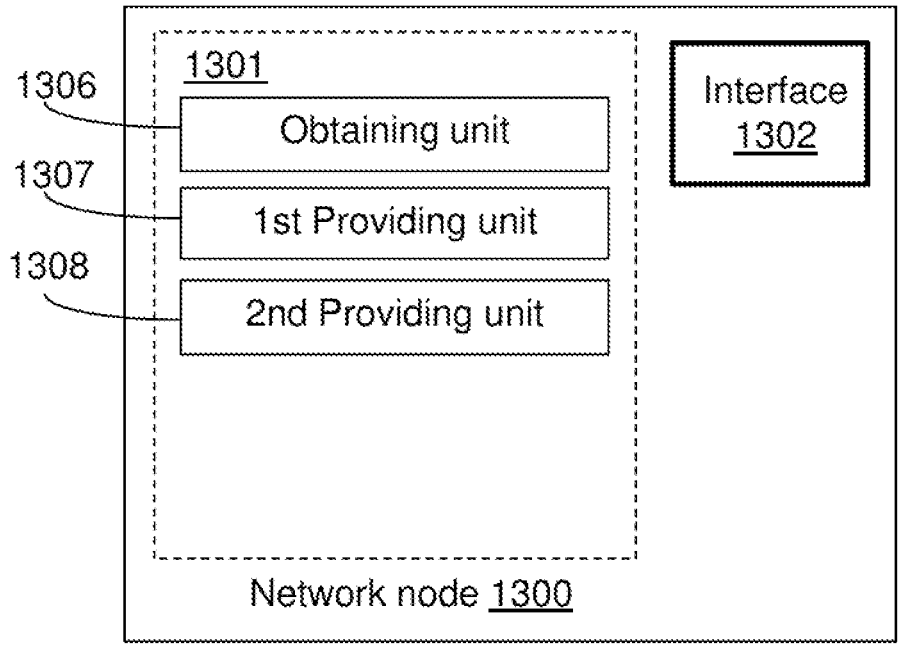

Network Node, FIGS. 13*a*-13*c*

An exemplifying embodiment of a network node, or an arrangement, operable in a wireless communication network is illustrated in a general manner in FIG. 13*a*. The network node may, as previously described, e.g. together with one or more other network nodes and/or resources or entities, represent the wireless communication network when communicating with wireless devices. The network node or arrangement 1300 is configured to perform at least one of the method embodiments described above with reference to FIGS. 5-9. The network node or arrangement 1300 is associated with the same technical features, objects and advantages as the previously described method embodiments. The network node or arrangement 1300 will be described in brief in order to avoid unnecessary repetition.

The network node or arrangement may be implemented and/or described as follows: The network node or arrangement 1300 comprises processing circuitry 1301, and one or more communication interfaces 1302. The processing circuitry may be composed of one or more parts which may be comprised in one or more nodes in the communication network, but is here illustrated as one entity.

The processing circuitry 1301 is configured to cause the network node or arrangement 1300 to obtain a request for a second type of positioning information from a wireless device. The processing circuitry 1301 is further configured to cause the network node or arrangement to provide information to the wireless device in response to the request, which information is valid for a predefined period of time and which enables obtaining of the second type of positioning only during the predefined period of time. The processing circuitry 1301 is further configured to cause the network node or arrangement to provide the second type of positioning information. The one or more communication interfaces 1302, which may also be denoted e.g. Input/Output (I/O) interfaces, include a network interface for sending data between nodes or entities in the communication network.

The processing circuitry 1301 could, as illustrated in FIG. 13*b*, comprise one or more processing means, such as a processor 1303, and a memory 1304 for storing or holding instructions. The memory would then comprise instructions, e.g. in form of a computer program 1305, which when executed by the one or more processing means 1303 causes the network node or arrangement 1300 to perform the actions described above. The processing circuitry 1301 may, as previously mentioned be composed of one or more parts and be comprised in, or distributed over, one or more nodes in the communication network as illustrated in FIGS. 14 and 15, but is here illustrated as one entity.

An alternative implementation of the processing circuitry 1301 is shown in FIG. 13*c*. The processing circuitry here comprises an obtaining unit 1306, configured to cause the network node or arrangement to obtain a request for a second type of positioning information from a wireless device. The processing circuitry further comprises a first providing unit 1307, configured to cause the network node or arrangement to provide information to the wireless device in response to the request, which information is valid for a predefined period of time and which enables obtaining of the second type of positioning only during the predefined period of time. The processing circuitry further comprises a second providing unit 1308, configured to cause the network node or arrangement to provide the second type of positioning information. The processing circuitry could comprise more units, and may, as previously mentioned be comprised in, or distributed over, one or more nodes or entities in the communication network, but is here illustrated as comprised in one entity.

The network nodes and arrangements described above could be configured for the different method embodiments described herein, e.g. in regard of how the different sets are determined and/or indicated to the wireless device.

Figure 14:
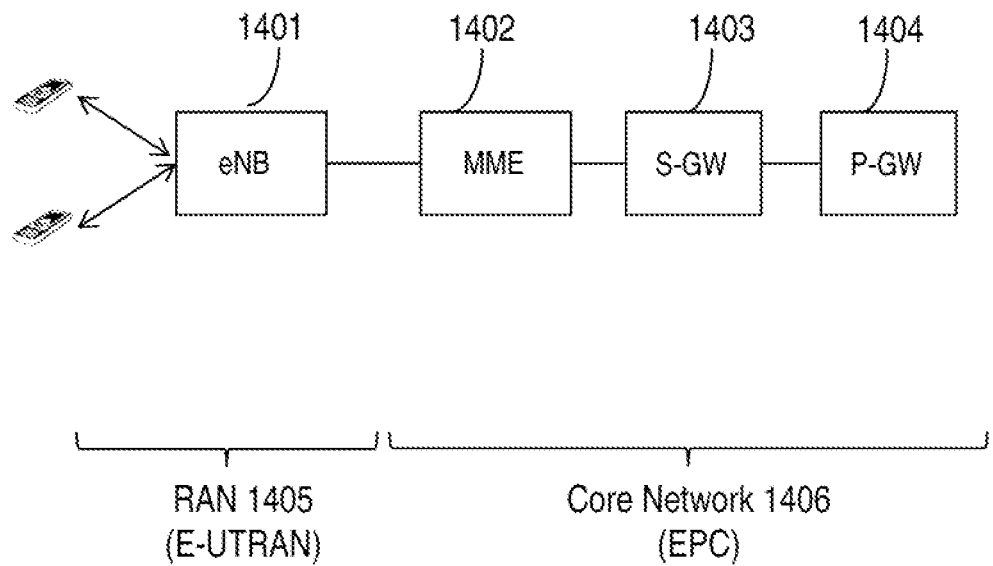
FIGS. 14-15 are schematic block diagrams illustrating different implementations of a wireless communication network, in which embodiments may be applied in a distributed or non-distributed manner.
Figure 15:
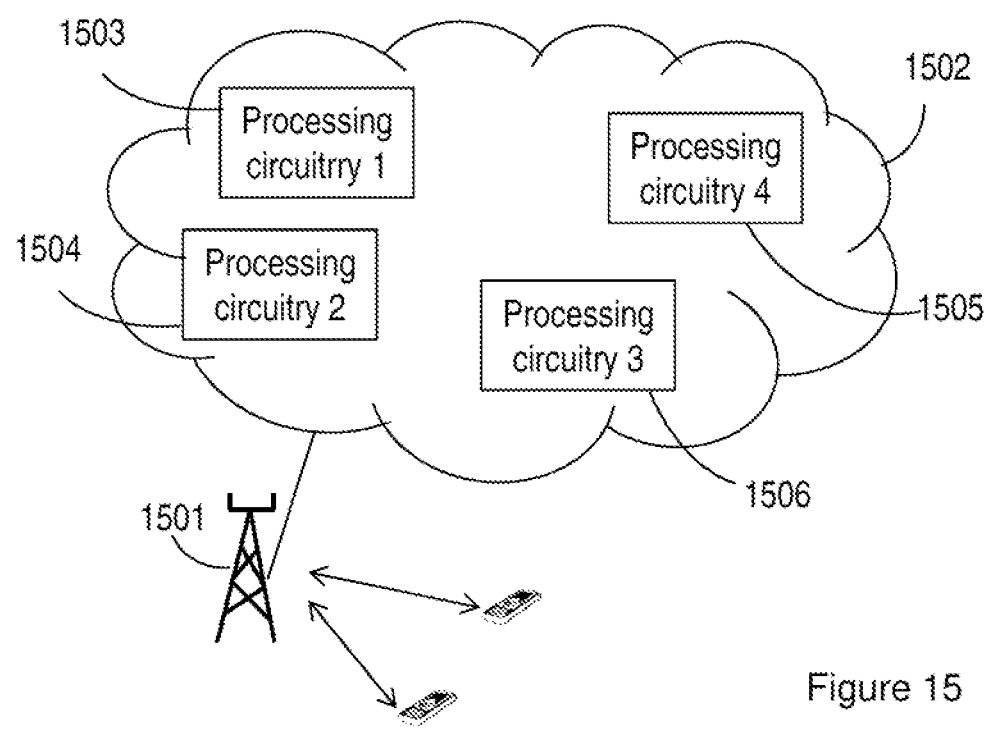

FIG. 14 illustrates an exemplifying wireless communication network, in this case an LTE network, in which the herein suggested solution may be implemented and applied. Wireless communication networks are often described in terms of a Radio Access Network, RAN 1405, and a Core network 1406. In LTE these are denoted E-UTRAN and EPC. The E-UTRAN 1405 comprises radio access nodes 1401, which are denoted eNBs. The EPC 1406 comprises core network nodes such as MME 1402, S-GW 1403 and P-GW 1404. The solution described herein could be implemented in one or more nodes in a network. For example, in the exemplifying network illustrated in FIG. 14, the functionality for performing the network part of the solution described herein could be implemented in the radio access node 1401, which would then obtain a request for a second type of positioning information from a wireless device. Alternatively, the functionality could be implemented in a core network node, such as the MME 1402 or some other control node. In that case, the core network node would obtain a request for a second type of positioning information and possibly inform the RAN node 1401 of the request, and e.g. induce the RAN node 1401 to provide the second type of positioning information. The functionality could be implemented in more than one node, e.g. such that the request for a second type of positioning information is performed by the MME 1402; and the providing of information to the wireless device in response to the request is performed by the eNB 1401.

FIG. 15 also illustrates an exemplifying wireless communication network, in which the herein suggested solution may be implemented. FIG. 15 intends to illustrate a so-called cloud solution, where resources e.g. in form of cloud entities comprising processing capacity or processing circuitry 1503-1506, in different locations may be used for implementing a certain functionality. The resources need not necessarily be located close to the antenna or access node 1501, but may be located e.g. in another region or country. Such resources may be owned by the network provider or operator, or may be provided or rented from a third party. In this type of solution, the functionality associated with a radio access node, e.g. such as the node 1401 in FIG. 14, could be implemented in one or more servers or entities located in different geographic positions. In regard of the solution described herein, the functionality for providing information to the wireless device in response to a request could be implemented in cloud entity 1503. Alternatively it could be implemented as a cooperation between cloud entities 1504 and 1505, while other features could be implemented in cloud entity 1506. This is an example of a distributed solution.

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program e.g. in one or more nodes of the wireless communication network. The processing circuitry described above may be implemented in a so-called cloud solution, referring to that the implementation may be distributed, and may be referred to e.g. as being located in a so-called virtual node or a virtual machine.

The flow diagram or diagrams presented herein may be regarded as a computer flow diagram or diagrams, when performed by one or more processors. A corresponding arrangement or apparatus may be defined as a group of function modules, where each step performed by a processor corresponds to a function module. In this case, the function modules are implemented as one or more computer programs running on one or more processors.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the communication network described above could be implemented by a combination of analog and digital circuits in one or more locations, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

When using the word "comprise" or "comprising" it shall be interpreted as non-limiting, i.e. meaning "consist at least of". The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

The invention claimed is:

1. A method performed by a wireless device in a communication network providing a first type of positioning information associated with a first positioning accuracy, the method comprising:
   requesting a second type of positioning information from the network, the second type of positioning information being associated with a second positioning accuracy;
   obtaining information from the network in response to the request, which information is valid for a predefined period of time and which enables the wireless device to obtain the second type of positioning information only during the predefined period of time; and
   performing one of positioning and assisting performance of positioning based on the obtained second type of positioning information, the second type of positioning information enabling the second positioning accuracy to be more accurate than the first positioning accuracy.

2. The method according to claim 1, wherein the information obtained in response to the request comprises at least one selected from the group consisting of:
   a parameter, which is invalid after the expiry of the predefined period of time;
   an indication of in which communication resources the second type of positioning information may be obtained during the predefined period of time;
   information enabling decoding of the second type of positioning information during the predefined period of time; and
   the second type of positioning information.

3. The method according to claim 1, wherein the predefined period of time is shorter than at least one of:
   24 hours;
   12 hours;
   1 hour;
   1 minute; and
   5 seconds.

4. The method according to claim 1, wherein the second type of positioning information comprises at least one selected from the group consisting of:
   an identity associated with one of a network node, a cell and a subcell;
   at least one sequence that supports a second timing estimation accuracy, finer than a timing estimation accuracy supported by the first type of positioning information;
   an information periodicity that support a second time to fix, shorter than a time to fix supported by the first type of positioning information; and
   at least one sequence that enables fine round-trip time estimation.

5. The method according to claim 1, wherein the one of performing of the positioning and the assisting of performance of positioning is further based on the first type of positioning information.

6. The method according to claim 1, wherein the first type of positioning information comprises at least one selected from the group consisting of:
   an identity associated with at least one node;
   at least one sequence that supports a first timing estimation accuracy, less fine than a timing estimation accuracy supported by the second type of positioning information; and
   information periodicity that supports a first time to fix, longer than a time to fix supported by the second type of positioning information.

7. A method performed by a network node in a communication network providing a first type of positioning information associated with a first positioning accuracy, the method comprising:
   obtaining a request for a second type of positioning information from a wireless device, the second type of positioning information being associated with a second positioning accuracy;
   providing information to the wireless device in response to the request, which information is valid for a predefined period of time and which enables obtaining of the second type of positioning information only during the predefined period of time; and
   providing the second type of positioning information, the second type of positioning information enabling the second positioning accuracy to be more accurate than the first positioning accuracy.

8. The method according to claim 7, wherein the information provided in response to the request comprises at least one selected from the group consisting of:
   a parameter, which is invalid after the expiry of the predefined period of time;
   an indication of in which communication resources the second type of positioning information may be obtained during the predefined period of time;
   information enabling decoding of the second type of positioning information during the predefined period of time; and
   the second type of positioning information.

9. The method according to claim 7, wherein the predefined period of time is shorter than at least one of:
   4 hours;
   12 hours;
   1 hour;
   1 minute; and
   5 seconds.

10. The method according to claim 7, wherein the second type of positioning information comprises at least one selected from the group consisting of:
- an identity associated with one of a network node, a cell and a subcell;
- at least one sequence that supports a second timing estimation accuracy, finer than a timing estimation accuracy supported by the first type of positioning information;
- an information periodicity that support a second time to fix, shorter than a time to fix supported by the first type of positioning information; and
- at least one sequence that enables fine round-trip time estimation.

11. The method according to claim 7, wherein the one of performing of the positioning and the assisting of performance of positioning is further based on the first type of positioning information.

12. The method according to claim 7, wherein the first type of positioning information comprises at least one selected from the group consisting of:
- an identity associated with at least one node;
- at least one sequence that supports a first timing estimation accuracy, less fine than a timing estimation accuracy supported by the second type of positioning information; and
- information periodicity that supports a first time to fix, longer than a time to fix supported by the second type of positioning information.

13. A wireless device configured for use in a communication network, the network providing a first type of positioning information associated with a first positioning accuracy, the wireless device being configured to:
- request a second type of positioning information from the network, the second type of positioning information being associated with a second positioning accuracy;
- obtain information from the network in response to the request, which information is valid for a predefined period of time and which enables the wireless device to obtain the second type of positioning information only during the predefined period of time; and
- perform one of positioning and assist performance of positioning based on the obtained second type of positioning information, the second type of positioning information enabling the second positioning accuracy to be more accurate than the first positioning accuracy.

14. The wireless device according to claim 13, wherein the information obtained in response to the request comprises at least one selected from the group consisting of:
- a parameter, which is invalid after the expiry of the predefined period of time;
- an indication of in which communication resources the second type of positioning information may be obtained during the predefined period of time;
- information enabling decoding of the second type of positioning information during the predefined period of time; and
- the second type of positioning information.

15. The wireless device according to claim 13, wherein the predefined period of time is shorter than at least one of:
- 24 hours;
- 12 hours;
- 1 hour;
- 1 minute; and
- 5 seconds.

16. The wireless device according claim 13, wherein the second type of positioning information comprises at least one selected from the group consisting of:
- an identity associated with one of a network node, a cell and a subcell;
- at least one sequence that supports a second timing estimation accuracy, finer than a timing estimation accuracy supported by the first type of positioning information;
- an information periodicity that support a second time to fix, shorter than a time to fix supported by the first type of positioning information; and
- at least one sequence that enables fine round-trip time estimation.

17. The wireless device according to claim 13, being configured to further base the one of performing of the positioning and the assisting of performance of positioning on the first type of positioning information.

18. The wireless device according to claim 13, wherein the first type of positioning information comprises at least one selected from the group consisting of:
- an identity associated with at least one node;
- at least one sequence that supports a first timing estimation accuracy, less fine than a timing estimation accuracy supported by the second type of positioning information; and
- information periodicity that supports a first time to fix, longer than a time to fix supported by the second type of positioning information.

* * * * *